United States Patent Office 3,773,714
Patented Nov. 20, 1973

3,773,714
SYNTHESIS OF CYCLIC ALUMINUM
COMPOUNDS
Lawrence H. Shepherd, Jr., Baton Rouge, La., assignor to Ethyl Corporation, Richmond, Va.
No Drawing. Filed Dec. 13, 1971, Ser. No. 207,518
Int. Cl. C07f 5/06
U.S. Cl. 260—448 A  12 Claims

ABSTRACT OF THE DISCLOSURE

Nonionic organoaluminum compounds possessing an aluminacyclopentene moiety are formed by reacting an alkali metal 1,1-dihydrocarbylaluminacyclopent-3-enide with an aluminum trihalide or a hydrocarbyl aluminum halide, the reaction being conducted in the presence of a Lewis base.

This invention relates to the synthesis of cyclic organoaluminum compounds, more particularly, compounds in which an aluminum atom is part of an olefinically unsaturated ring system.

BACKGROUND

Lehmkuhl, Angew. Chem. International Edition 5, 663 (1966), indicates that reaction of butadiene with alkali metal in an ether in the presence of an amount of trimethylaluminum-ether adduct equivalent to the metal causes the formation of the complex:

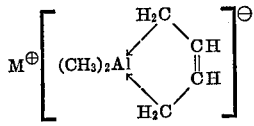

where M is lithium or sodium. This adduct is insoluble in aliphatic hydrocarbons and benzene. It decomposes above 150° C. without melting.

In copending application Ser. No. 771,651, filed Oct. 29, 1968, now U.S. 3,631,065, it is shown that nonionic organoaluminum compounds possessing an aluminacycloalkene moiety are produced by causing interaction among aluminum, a conjugated diene and a hydrocarbon aluminum hydride in the presence of a Lewis base capable of complexing with the nonionic organoaluminum compound without undergoing excessive cleavage. For example, when the diene reactant is butadiene or butadiene substituted in the two position or in the two and three positions, the principal product produced is characterized by the formula:

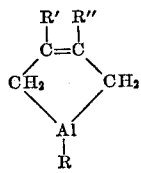

wherein R is a hydrocarbon group having up to about 18 carbon atoms; R' is a hydrogen, alkyl or alkenyl group; and R" is a hydrogen or alkyl group.

Another method of synthesizing these nonionic organoaluminum compounds is described in copending application Ser. No. 822,046, filed May 5, 1969, now U.S. 3,634,482. This latter method comprises causing interaction among aluminum, a conjugated diene, an alkali metal aluminum tetrahydrocarbyl and hydrogen, the reaction being conducted in the presence of a Lewis base capable of complexing with the nonionic organoaluminum compound without undergoing excessive cleavage.

THE INVENTION

This invention relates to still another efficient method for the synthesis of the foregoing nonionic organoaluminum compounds. In particular, this invention relates to the discovery that nonionic organoaluminum compounds possessing an aluminacyclopentene moiety can be formed by reacting an alkali metal 1,1-di-hydrocarbylaluminacyclopent-3-enide with an aluminum trihalide or a hydrocarbyl aluminum halide in the presence of a Lewis base capable of complexing with the nonionic organoaluminum compound so formed.

For best results the reaction is conducted in or in the presence of such Lewis bases as tertiary amines, dialkyl ethers, cycloparaffinic monoethers having a five or six membered ring, cycloparaffinic diethers having a five or six membered ring, or the like. The use of ethers as the Lewis base for the reaction is preferred, some exemplary materials being diethyl ether, dibutyl ether, tetrahydrofuran, 1,3-dioxolane, tetrahydropyran, and 1,4-dioxane.

It is possible to utilize this reaction in different ways. One alternative is to conduct this reaction in such a way that the resultant nonionic cyclic organoaluminum compound does not react with the Lewis base beyond the stage of forming a simple addition complex therewith. This is accomplished by reacting the alkali metal 1,1-dihydrocarbylaluminacyclopent-3-enide with the aluminum trihalide or hydrocarbyl aluminum halide in the presence of a Lewis base which is capable of complexing with the nonionic cyclic organoaluminum compound produced (i.e., the nonionic compound possessing an aluminacyclopentene moiety) without undergoing excessive cleavage under the reaction conditions employed. Because this alternative makes the nonionic cyclic organoaluminum compounds available for a wide variety of applications, this constitutes a preferred embodiment of the invention.

Another alternative is to perform the process in such a way that essentially as soon as the nonionic cyclic organo-aluminum compound is formed it cleaves and reacts with an appropriate Lewis base via a condensation reaction to form a different organoaluminum product which on hydrolysis yields a branched chain alkenol. For example reaction of an alkali metal 1,1-dihydrocarbylaluminacyclopent-3-enide with aluminum tribromide in excess tetrahydrofuran or alkyl substituted tetrahydrofuran at 140–150° C. followed by hydrolysis (preferably with an aqueous mineral acid) gives an alkenol having a terminal double bond and possessing the number of carbon atoms equal to the sum of the number of carbon atoms in the aluminacyclopent-3-ene moiety of the alkali metal 1,1-dihydrocarbylaluminacyclopent-3-enide (4 if derived from butadiene, 5 if derived from isoprene, etc.) plus the number of carbon atoms present in the tetrahydrofuran or alkyl substituted tetrahydrofuran. This cleavage-condensation reaction may be applied to tetrahydropyran and alkyl substituted tetrahydropyrans but in this case reaction temperatures at least as high as about 185–190° C. are required to achieve the cleavage of the tetrahydropyran ring by the aluminacyclopentene moiety of the nonionic cyclic organoaluminum compound formed in the process. Because the alkali metal 1,1-dihydrocarbylaluminacyclopent-3-enides tend to decompose at temperatures of 185–190° C., it is best to perform these tetrahydropyran cleavage reactions in two stages—i.e., form the nonionic cyclic organoaluminum compound in tetrahydropyran at a temperature below about 150° C. and then raise the temperature to at least about 185–190° C. It is interesting to note that the alkali metal 1,1-dihydrocarbylaluminacyclopent-3-enides do not cleave tetrahydrofuran or tetrahydropyran to any appreciable extent and thus the ionic compounds of Lehmkuhl are not suitable for this utility.

Since Lewis bases such as ethers often differ in their resistance to cleavage by the nonionic cyclic organoaluminum compound formed in the process of this invention and since the use of higher reaction temperatures tends to enhance the likelihood of or favor the cleavage reaction, these factors should be taken into account when selecting the Lewis base and the reaction temperatures to be used in any given situation. For example, when seeking to prepare and maintain a nonionic organoaluminum compound possessing an aluminacyclopentene moiety, tetrahydrofuran is a highly suitable Lewis base if the process is conducted at temperatures below, at or slightly above room temperature. However, as noted above at higher temperatures (e.g., 140–150° C.) the nonionic cyclic organoaluminum compound reacts essentially as soon as it is formed with the tetrahydrofuran via the cleavage-condensation reaction. Tetrahydropyran and 1,4-dioxane are examples of Lewis bases which are more resistant to this cleavage-condensation reaction. The nonionic cyclic organo-aluminum compound formed in the process of this invention does not cleave tetrahydropyran to any significant extent until temperatures of about 185–190° C. are reached and 1,4-dioxane remains unaffected by the nonionic cyclic organoaluminum product even at these high temperatures.

The process of this invention may be depicted by the following illustrative equations:

(1) Reaction employing aluminum trihalide

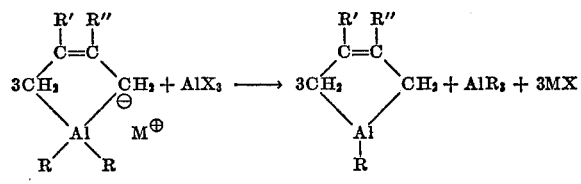

(2) Reaction employing hydrocarbyl aluminum dihalide

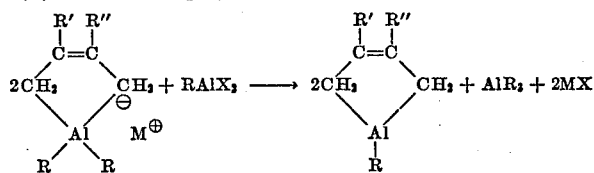

(3) Reaction employing dihydrocarbyl aluminum halide

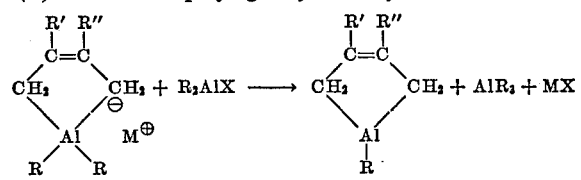

In the above equations R is a hydrocarbon group having up to about 18 carbon atoms, preferably a lower alkyl group; R' is a hydrogen, alkyl or alkenyl group; R" is a hydrogen or alkyl group; and X is a halogen, normally chlorine, bromine or iodine. The preferred reactants are those in which X is chlorine or bromine as these are less expensive and have good reactivities.

Methods for the synthesis of the alkali metal 1,1-dihydrocarbylaluminacyclopent-3-enide reactant are known and available to those skilled in the art. See, for example, the Lehmkuhl paper referred to above, the disclosure of which is incorporated herein. Exemplary of such reactants are the following: lithium, sodium, potassium, rubidium and cesium 1,1-dimethylaluminacyclopent-3-enide; Li, Na, K, Rb, and Cs 1,1-diethylaluminacyclopent-3-enide; Li, Na, K, Rb, and Cs 1,1-dibutylaluminacyclopent-3-enide; Li, Na, K, Rb, and Cs 1,1-dioctylaluminacyclopent-3-enide; Li, Na, K, Rb, and Cs 1,1-dicyclohexylaluminacyclopent-3-enide; Li, Na, K, Rb, and Cs 1,1-dicyclohexenylaluminacyclopent-3-enide; Li, Na, K, Rb, and Cs 1,1-dibenzylaluminacyclopent-3-enide; Li, Na, K, Rb, and Cs 1,1-diphenylaluminacyclopent-3-enide; Li, Na, K, Rb, and Cs 1,1-di-p-tolylaluminacyclopent-3-enide; Li, Na, K, and Cs 1,1-dipropyl-3-methylaluminacyclopent-3-enide; Li, Na, K, Rb, and Cs 1,1-dimethyl-3-ethylaluminacyclopent-3-enide; Li, Na, K, Rb, and Cs 1,1-dibutyl-3,4-dimethylaluminacyclopent-3-enide; Li, Na, K, Rb, and Cs 1,1-dimethyl-3-phenylaluminacyclopent-3-enide; Li, Na, K, Rb, and Cs 1,1-dimethyl-3-(4-methylpent-3-enyl)aluminacyclopent-3-enide; and the like. Other exemplary compounds of this type will now be apparent to those skilled in the art.

From the cost standpoint the use of lithium, sodium, or potassium 1,1-dihydrocarbylaluminacyclopent-3-enides as a reactant is preferred, the sodium reagents being particularly desirable in this respect. In the usual situation the two monovalent hydrocarbyl groups attached to the aluminum atom of the alkali metal 1,1-dihydrocarbylaluminacyclopent-3-enide reactant (R in Equations 1–3 above) will correspond to the organic groups present in the trihydrocarbyl aluminum compound used in synthesizing this alkali metal reactant. Since trialkyl aluminum compounds are readily available at reasonable cost, these two substituent groups will often be alkyl groups each containing up to about 18 and preferably up to about 8 carbon atoms. Other hydrocarbyl derivatives are suitable, however.

The other primary reactant in the process of this invention is an aluminum halide which may be represented by the formula $$R_nAlX_m$$

wherein R is a hydrocarbyl group having up to about 18 carbon atoms, X is a halogen (i.e., Cl, Br, or I), $n$ is 0–2 inclusive, and $m$ is 1–3 inclusive, the sum of n and m being 3. Thus the aluminum halide reactant may be an aluminum trihalide or a hydrocarbyl aluminum halide (i.e., a dihydrocarbyl aluminum monohalide, a hydrocarbyl aluminum dihalide, or a hydrocarbyl aluminum sesquihalide). The halogen atom(s) of this reactant will normally be chlorine, bromine, or iodine, as the fluorine derivatives tend either to have insufficient solubility or insufficient reactivity for convenient use in the process of this invention. Illustrative aluminum halides for use in the process include aluminum trichloride, aluminum tribromide, aluminum triiodide; methylaluminum sesquichloride, -sesquibromide, -sesquiiodide; dimethylaluminum chloride, -bromide, -iodide; methylaluminum dichloride, -dibromide, -diiodide; ethylaluminum sesquichloride, -sesquibromide, -sesquiiodide; diethylaluminum chloride, -bromide, -iodide; ethylaluminum dichloride, -dibromide, -diiodide; isobutylaluminum sesquichloride, -sesquibromide, -sesquiiodide; diisobutylaluminum chloride, -bromide, -iodide; isobutylaluminum dichloride, -dibromide, diiodide; dihexylaluminum chloride, -bromide, -iodide; octylaluminum dichloride, -dibromide, -diiodide; decylaluminum sesquichloride, -sesquibromide, -sesquiiodide; octadecylaluminum dichloride, -dibromide, -diiodide; and the like. Still other suitable reactants are diphenylaluminum chloride, benzylaluminum dibromide, dicyclopentylaluminum chloride, 6-heptenylaluminum sesquiiodide, bis-2-butenylaluminum chloride, and similar hydrocarbyl aluminum halides. Generally speaking, the use of alkyl aluminum chlorides or bromides, aluminum trichloride or aluminum tribromide is preferred as these compounds are more inexpensive than the corresponding iodides.

As noted above, reaction is conducted in the presence of a Lewis base having the desired chemical stability or reactivity under the reaction conditions being utilized. In most cases this Lewis base will be employed as the principal reaction solvent—i.e., the reaction will be conducted in the Lewis base selected for use. However, if desired, the reaction may be effected in a suitable inert hydrocarbon medium (e.g., paraffinic or aromatic hydrocarbon solvents such as hexane, heptane, octane, decane, cyclohexane, benzene, toluene, xylenes, and the like) provided a proper amount of the Lewis base is also present in the reaction system. Ordinarily the system should contain at least 1–2 mols of Lewis base per mol of alkali metal 1,1-dihydrocarbylaluminacyclopent-3-enide employed. Particularly convenient Lewis bases for use in the process are tertiary amines (e.g., trimethyl amine, dimethylethyl amine, triethyl amine, tributyl amine, triphenyl amine, tribenzyl amine, benzyldimethyl amine, N-methyl morpholine, N,N-diethyl aniline, N,N,N',N'-tetramethyl methylene diamine, N,N,N',N'-tetramethyl ethylene diamine, pyridine, N-methyl pyrrolidine, triethylene diamine, quinuclindine, and the like); dialkyl ethers (e.g., dimethyl ether, diethyl ether, diisopropyl ether, methylisoamyl ether, dibutyl ether, dihexyl ether and the like); cycloparaffinic monoethers having a six membered ring (e.g., tetrahydropyran—pentamethylene oxide—and ring alkylated derivatives thereof); and cycloparaffinic diethers having a five or six membered ring (e.g., 1,4-dioxane, 1,3-dioxane, 2-methyl-2-ethyl-1,3-dioxolane; and the like); and other similar substances such as dicyclohexyl ether, dibenzyl ether, and the like.

The relative proportions of the reactants and reaction diluents do not appear to be critical as long as there is present a sufficient amount of each reactant to participate in the reaction. The stoichiometry of the reactions which form the nonionic cyclic organoaluminum compounds is given in Equations 1–3 above.

In conducting the process for forming the cyclic organoaluminum compounds various temperature conditions can be employed so long as the effect of temperature on cleavage of the Lewis base being used is taken into consideration. Since in most cases the reaction proceeds readily at ordinary room temperatures (e.g., 15–25° C.) it will be found convenient when seeking to avoid the cleavage reaction to perform the reaction under ordinary room temperature conditions. However if desired the reaction may be carried out at subzero temperature (e.g., as low as −20° C. or below) so long as at least a portion of the reaction mixture remains in a liquid state. Conversely, heat may be applied to speed up the reaction with the proviso that the temperature not be elevated to such an extent to cause excessive cleavage of the particular Lewis base in the system, unless of course the reaction is being utilized for the purpose of effecting the cleavage-condensation reaction. Thus it is possible by suitable choice of reactants, reaction solvent and Lewis base to perform the reaction at temperature as high as about 150° C. or above. Normally, reaction temperatures within the range of about 0° C. to about 100° C. will suffice when the cleavage reaction is not the objective.

It will of course be understood that the reaction mixture should be kept essentially anhydrous and that exposure of the reaction system to air should be kept at a minimum. By the same token when using the aluminum trihalides as the reactants, these should be used in their essentially unhydrated forms.

The period of time during which the reactants interact with each other is susceptible to variation and is generally discretionary. In general, the reaction tends to proceed very rapidly even at room temperature and thus long reaction periods will be required only infrequently. When conducting the reaction in a liquid medium in which the co-product alkali metal halide salt is insoluble, the appearance of the resultant solid phase serves as a convenient index of the reaction.

In order to still further appreciate the practice of this invention, the following illustrative example is presented.

EXAMPLE

A solution of sodium 1,1-dimethyaluminacyclopent-3-enide in tetrahydrofuran was prepared by the procedure of Lehmkuhl (loc. cit.). This solution was added to a clear, reddish solution of anhydrous aluminum tribromide in tetrahydrofuran, the operation taking place at room temperature. The reddish color of the aluminum tribromide solution began disappearing immediately with the concurrent formation of a white precipitate of sodium bromine. The solution, after filtration, contained 4.75 mmoles of 1-methylaluminacyclopent-3-ene tetrahydrofuranate and trimethylaluminum dissolved in excess tetrahydrofuran. The existence of 1-methylaluminacycopent-3-ene was verified by raising the reaction temperature of this solution to 150° C. for 3.5 hours in order to cause the aluminacyclopent-3-ene moiety to cleave and react with the tetrahydrofuran. The resultant reaction mixture was subjected to acid hydrolysis (aqueous HCl) and extracted with diethyl ether. The presence in the extract of 0.32 gram (2.42 mmoles, 53.7%) of 3-methyl-1-hepten-7-ol (the cleavage/hydrolysis product) was established by quantitative VPC methods.

Various uses for the nonionic organoaluminum compounds produced in the process of this invention are set forth in copending applications Serial No. 771,651, filed Oct. 29, 1968, now U.S. 3,631,065; Serial No. 821,954, filed May 5, 1969, now U.S. 3,641,084; Serial No. 822,046, filed May 5, 1969, now U.S. 3,634,482; and Serial No. 889,741, filed Dec. 31, 1969, now U.S. 3,642,825, the disclosure of all such applications being incorporated herein by the foregoing reference.

The cyclic organoaluminum compounds formed in the process of this invention have a marked tendency to form complexes with Lewis bases and thus usually the product will involve complexation between the cyclic organoaluminum compound and the Lewis base in whose presence the reaction was conducted. While it is possible to separate the resultant Lewis base complex from the trihydrocarbyl aluminum co-product of the process, this is usually unnecessary as the cyclic aluminum compound may be used in synthesis reactions which are unaffected by the presence of the trihydrocarbyl aluminum. The alkenol synthesis set forth in the above example serves as an illustration of such a situation.

What is claimed is:

1. A process of forming a nonionic organoalumium compound possessing an aluminacylopentene moiety which comprises reacting an alkali metal, 1,1-dihydrocarbylaluminocyclopent-3-enide with an aluminum trihalide (chloride, bromide or iodide) or a hydrocarbyl aluminum halide (chloride, bromide or iodide) to form said nonionic compound, the reaction being conducted in the presence of a Lewis base capable of complexing with the nonionic organoaluminum compound so formed.

2. A process of preparing a nonionic organoaluminum compound possessing an aluminacyclopentene moiety which comprises reacting an alkali metal 1,1-dihydrocarbylaluminocyclopent-3-enide with an aluminum trihalide (chloride, bromide or iodide) or a hydracarbyl aluminum halide (chloride, bromide or iodide) to produce said nonionic compound, the reacting being conducted in the presence of a Lewis base capable of complexing with the nonionic organoaluminum compound produced without undergoing excessive cleavage under the reaction conditions employed.

3. The process of claim 2 wherein the alkali metal 1,1-dihydrocarbylaluminacyclopent-3-enide is reacted with aluminum trichloride or aluminum tribromide.

4. The process of claim 2 wherein the alkali metal 1,1-dihydrocarbylaluminacyclopent-3-enide is reacted with an alkyl aluminum chloride or bromide.

5. The process of claim 2 performed at a temperature in the range of from about −20 to about 150° C.

6. The process of claim 2 wherein the reaction is performed in an ether reaction medium at a temperature in the range of from about −20 to about 150° C.

7. The process of claim 6 wherein said ether is a dialkyl ether or a cycloparaffinic mono- or diether having a five or six membered ring.

8. The process of claim 2 wherein the alkali metal of the alkali metal 1,1-dihydrocarbylaluminacyclopent-3-enide is sodium.

9. The process of claim 2 wherein an alkali metal 1,1-dialkylaluminacyclopent-3-enide is reacted with aluminum trichloride or aluminum tribromide at a temperature in the range of from about −20 to about 150° C. in an ether reaction medium.

10. The process of claim 2 wherein the Lewis base is employed as the principal reaction solvent.

11. The process of claim 2 wherein said alkali metal 1,1-dihydrocarbylaluminacyclopent-3-enide is an alkali metal 1,1-dialkylaluminacyclopent-3-enide.

12. The process of claim 2 wherein sodium 1,1-dimethylaluminacyclopent-3-enide is reacted with aluminum tribromide in tetrahydrofuran at approximately room temperature.

References Cited

UNITED STATES PATENTS

| | | | |
|---|---|---|---|
| 3,470,224 | 9/1969 | Lehmkuhl | 260—448 A |
| 3,493,623 | 2/1970 | Brendel | 260—448 A |
| 3,629,346 | 12/1971 | Skinner | 260—448 A |
| 3,631,065 | 12/1971 | Brendel et al. | 260—448 A |
| 3,634,482 | 1/1972 | Shepherd | 260—448 A |
| 3,641,084 | 2/1972 | Shepherd | 260—448 A |
| 3,669,990 | 6/1972 | Shepherd | 260—448 A |
| 3,670,001 | 6/1972 | Shepherd | 260—448 A |

HELEN M. S. SNEED, Primary Examiner